Patented Dec. 24, 1935

2,025,048

UNITED STATES PATENT OFFICE 2,025,048

CELLULOSE DERIVATIVE COMPOSITION

George De Witt Graves, Wilmington, Del., assignor to E. I. du Pont de Nemours & Company, Wilmington, Del., a corporation of Delaware No Drawing. Application July 7, 1934,
Serial No. 734,210

11 Claims. (Cl. 106—37)

This invention relates to new compositions of matter comprising esters of high molecular weight ethers of polyhydric alcohols, and more particularly to carboxylic acid esters of high molecular weight ethers of polyhydric alcohols, and still more particularly to carboxylic acid esters of long chain aliphatic ethers of dihydric alcohols.

This invention has as an object the preparation of esters of high molecular weight ethers of polyhydric alcohols. A further object is the preparation of plastic compositions comprising these esters. A still further object is the preparation of cellulose derivative compositions containing these esters. Other objects will appear hereinafter.

These objects are accomplished by the following invention wherein an ester of a high molecular weight, i. e., long chain aliphatic ether of a polyhydric alcohol, is reacted with an organic acid, and particularly an organic carboxylic acid or the anhydride, chloride, or ester thereof. Certain of the objects are also accomplished by the utilization of these esters in plastic compositions, and particularly cellulose derivative compositions.

In the process of the present invention an ester of a high molecular weight, i. e., long chain alkyl ether of a polyhydric alcohol such as the monolauryl ether of ethylene glycol, is prepared by reacting the long chain alkyl ether of the polyhydric alcohol with an organic acid, and particularly an organic carboxylic acid or its anhydride, its chloride, or its ester with a volatile alcohol. A further method of preparation consists in the reaction of the halide ester of the long chain alkyl ether of the polyhydric alcohol, for example, lauroxyethyl chloride, with the sodium or other metal salt of the organic acid.

Having outlined above the general purposes and principles of the invention, the following applications thereof to certain specific instances are included for purposes of illustration and not in limitation.

Example 1.—Laurate of monolauryl ether of ethylene glycol

Two hundred thirty parts by weight of the monolauryl ether of ethylene glycol and 190 parts by weight of lauric acid were heated for 5 hours at 225°–230° C. The waxy product had an acid number of 3.6, and an ester number of 128.7.

Example 2.—Acetate of monolauryl ether of ethylene glycol

Seventy-three parts by weight of lauroxyethanol and 25 parts by weight of acetyl chloride were slowly mixed together and after standing for one hour were heated on the steam bath to drive off excess acetyl chloride. The product was washed with aqueous potassium carbonate solution, dried and filtered. It had a saponification number of 215.

Example 3.—Stearate of monolauryl ether of diethylene glycol

A mixture of 65 parts by weight of the monolauryl ether of diethylene glycol and 62 parts by weight of stearic acid was heated four hours at 240° C. The wax-like product melted at 24° C. The acid number of the product was 9.4, and the saponification number was 111.

Example 4.—Adipate of monolauryl ether of ethylene glycol and monolauryl ether of diethylene glycol Twenty-two parts by weight of a mixture of monolauryl ether of ethylene glycol and monolauryl ether of diethylene glycol was heated with 4.4 parts by weight of adipic acid 18 hours at 200°–210° C. The acid number of the product was 7.3, and the saponification number was 143.7.

Example 5.—Phthalate of mixed monoalkyl ethers of ethylene glycol

A mixture of the alcohols obtained by hydrogenation of coconut oil was reacted in an autoclave with ethylene oxide to obtain the mixed monoalkyl ethers of glycol. Four hundred and fifty parts by weight of these mixed ethers, 150 parts by weight of phthalic anhydride, 300 parts by weight of ethylene dichloride, and 2 parts by weight of sulfuric acid were heated to boiling in an apparatus designed to separate water from the distillate and to return the ethylene dichloride to the reaction vessel. Distillation was continued until the theoretical amount of water had been removed. The product was washed with sodium carbonate solution to remove excess acid and was refined by heating to 130° C. at 50 mm. pressure to remove volatile material. The resulting product was treated with decolorizing carbon and filtered. A light colored oil resulted.

Example 6.—Oleate of monolauryl ether of ethylene glycol and monolauryl ether of diethylene glycol Forty parts by weight of oleic acid and 53 parts by weight of a mixture of the monolauryl ether of ethylene glycol and the monolauryl ether of diethylene glycol were heated 18 hours at 215° C. The acid number of the product was 6.9, and the saponification number was 105.6. The oleate of the monolauryl ether of ethylene glycol was also made by heating under a fractionating column a mixture of one gram mole of the monolauryl ether of ethylene glycol, 1.1 gram moles of methyl oleate, 500 parts by weight of toluene and 5 parts by weight of litharge. Heating was continued until the theoretical amount of the methyl alcohol had been removed as a binary with toluene. The product was filtered and heated to 130° C. at 50 mm. pressure, followed by steaming to remove all traces of volatile material.

*Example 7.—Levulinate of monolauryl ether of ethylene glycol*

Twenty-nine parts by weight of lauroxyethanol, 14.6 parts by weight of levulinic acid were heated at 170°–180° C. for 8 hours. The product had a very low acidity. On distillation 24 parts by weight of liquid product boiling 184°–187° C. at 1.5 mm. was isolated which contained the theoretical quantity of carbon and hydrogen. The product was soluble in alcohol, ethyl acetate, benzene, acetone, gasoline, but insoluble in water.

The above examples indicate the use of certain specific long chain alkyl ethers of polyhydric alcohols and certain organic acids.

It is possible to substitute other dihydric alcohols for the ethylene glycol disclosed in some of the above examples. Dihydric alcohols containing from 2 to 22 carbon atoms inclusive, may be employed. These can be prepared by carboxyl hydrogenation of the corresponding hydroxy acids, or by the addition of a molecule of water to the corresponding unsaturated monohydric alcohols. They may also be produced by peracetylation of olefines or other unsaturated alcohols. Many of these polyhydric alcohols may be reacted with a long chain alcohol to form a monoether which is subsequently reacted with any of the above acids to prepare the esters of the present invention. The alcohols which may be employed to form the monalkyl ethers of dihydric alcohols embrace alcohols from vegetable oils by hydrogenation, for example, the alcohols present in carboxyl hydrogenated coconut oil, the alcohols obtained from animal oils, such as sperm oil by carboxyl hydrogenation, naphthenyl alcohols by carboxyl hydrogenation of naphthenic acid, eleostearyl alcohol by sodium reduction of China-wood oil, linoleyl alcohol by sodium reduction of linseed oil, ricinoleyl alcohol by sodium reduction of castor oil, abietyl alcohol by sodium reduction of abietic acid, or the higher alcohols obtained in the methanol synthesis.

By "long chain" alcohol is meant an alcohol having at least 8 carbon atoms to the chain, thus including octyl, decyl, lauryl, myristyl, stearyl, cetyl, as well as other long chain alcohols. "Long chain" alkyl has a similar significance. A particularly useful source of long chain alcohols lies in the mixture of alcohols obtainable from coconut oil by hydrogenation, which consists largely of lauryl alcohol. This mixture may be employed as well as pure lauroxyethanol or the crude form obtainable by reacting lauryl alcohol with ethylene oxide which contains, in addition to lauroxyethanol, unreacted lauryl alcohol and the monolauryl ether of diethylene glycol.

Organic acids in general may be employed, including the aliphatic acids, for example those of 1 to 18 carbon atoms inclusive, the acids being either branched or straight chain, substituted or unsubstituted, saturated or unsaturated, and including acetic, propionic, isobutyric, butyric, branched chain acids corresponding to the higher alcohols obtained in the methanol synthesis, capric, caprylic, lauric, levulinic, glycollic, lactic, methoxyacetic, and oleic. Polybasic acids are included within the scope of the invention, including succinic, adipic, and maleic. Aromatic monobasic, and polybasic acids such as benzoic, phthalic, benzoylbenzoic, chlorobenzoylbenzoic; alicyclic acids, such as naphthenic, hexahydrobenzoic, octahydrocinnamic, cyclohexylacetic; and resin acids, such as abietic acid, may be used. Any of the acids mentioned in the examples may be replaced by the above acids or the methyl ester of any of these acids may be substituted for the methyl laurate of Example 6. The acid chloride of any of the acids may be used in place of the acid itself.

Satisfactory plasticized compositions may be formulated using these esters of long chain alkyl ethers of polyhydric alcohols and particularly the long chain alkyl ethers of ethylene glycol and polyethylene glycols. The following examples of these are included for purposes of illustration and not in limitation.

*Example 8*

| | Parts |
|---|---|
| Cellulose nitrate | 25 |
| Acetate of monolauryl ether of ethylene glycol | 10 |
| Albertol resin | 3 |
| Solvent | 100 |

*Example 9*

| | Parts |
|---|---|
| Cellulose acetate | 20 |
| Acetate of monooctyl ether of ethylene glycol | 8 |
| Solvent | 250 |

*Example 10*

| | Parts |
|---|---|
| Ethyl cellulose | 12 |
| Laurate of monodecyl ether of diethylene glycol | 4 |
| Solvent | 180 |

*Example 11*

| | Parts |
|---|---|
| Cellulose isobutyrate | 12 |
| Pigment | 16 |
| Resin | 3.5 |
| Oil | 3.5 |
| Isobutyrate of monocetyl ether of ethylene glycol and diethylene glycol | 4 |
| Solvent | 81 |

*Example 12*

| | Parts |
|---|---|
| Polyvinyl chloride-polyvinyl acetate resin | 10 |
| Oleate ester of monodecyl ether of ethylene glycol | 12 |
| Pigment | 10 |
| Solvent | 50 |

*Example 13*

| | Parts |
|---|---|
| Aldehyde modified polyvinyl acetate | 10 |
| Diphthalate ester of monooctyl ether of ethylene glycol | 2 |
| Solvent | 100 |

The compositions of the above examples may be used in the coating of metal, wood, fabric, wire, wire screen, paper, leather, and the like, and in all of the above examples the term "solvent" may be understood as designating suitable mixtures of esters, alcohols, and hydrocarbons, such as would be obvious to those skilled in the art.

Typical plastic compositions containing the ether esters of the present invention are included below for purposes of illustration:

Example 14

| | Parts |
|---|---|
| Cellulose nitrate | 100 |
| Propionate ester of monooctyl ether of ethylene glycol | 60 |
| Pigment | 200 |

Example 15

| | Parts |
|---|---|
| Ethyl cellulose | 100 |
| Monoacetate of lauryl ether of ethylene glycol and lauryl ether of diethylene glycol | 15 |

Example 16

| | Parts |
|---|---|
| Methyl methacrylate resin | 100 |
| Laurate of monostearyl ether of ethylene glycol | 15 |

Example 17

| | Parts |
|---|---|
| Cellulose propionate | 100 |
| Propionate of monodecyl ether of diethylene glycol | 20 |

These plastic compositions may be prepared with or without the usual volatile solvents, such as alcohols, acetone or mixtures of toluene, alcohol, etc. In these plastic, as well as in the coating compositions, other cellulose derivatives may be employed including cellulose butyrate, benzyl cellulose, lauryl cellulose, butyl cellulose, cellulose crotonate, etc., and other natural resins such as damar, kauri, sandarac, shellac, and the like. Other synthetic resins such as polymerized vinyl acetate, phenol-aldehyde resins, polybasic acid-polyhydric alcohol condensation products, as well as phthalic ether resins, ketone resins, and the like, may be employed.

It will be noted that many of the resins as well as the cellulose derivatives with which the esters of the present invention are so advantageous, are characterized by the fact that they are polymeric organic substances having a plurality of C—O—C linkages, and it is perhaps to this characteristic that the esters of the present invention owe their advantageous plasticizing compatibilities. It is to be noted that the esters of the present invention may be used in various proportions with the organic plastic substance. Thus one part of ester to three parts of ethyl cellulose in Example 10; 1.2 parts of ester per part of resin in Example 12; and one part of ester to five parts of resin in Example 13. A portion of the plasticizer in the composition may be replaced by other plasticizers of the group covered by the present invention, or by one or more plasticizers already known to the art, such as triacetin, camphor, dibutyl phthalate, tricresyl phosphate, methoxyethyl phthalate, etc.

The compounds of this invention may be used in the preparation of lacquers and enamels for coating metal, wood, fabric, paper, and wire screen, dopes for coating fabrics, moistureproof lacquers for coating regenerated cellulose, etc., and in plastic compositions to be used in the manufacture of toilet ware, sheeting, rods, tubes, safety glass interlayers, dentures, etc.

The esters of long chain ethers of ethylene glycol or diethylene glycol are particularly useful as moistureproofing plasticizers for cellulose derivatives. Lauroxyethyl laurate and lauroxyethyl acetate plasticize cellulose acetate compositions, and lauroxyethyl laurate or lauroxyethyl stearate may be substituted for castor oil as a softener for artificial leather. Lauroxyethyl laurate is a moistureproofing softener for nitrocellulose. Lauroxyethyl stearate may be used as a substitute for wax in moistureproofing transparent sheet regenerated cellulose, and lauroxyethyl adipate may be used in smokeless powder compositions. Because of their absence of odor and low volatility, they may be used as perfume fixatives.

The esters of the present invention are high-boiling, water-insoluble, hydrocarbon soluble esters of high molecular weight ethers of polyhydric alcohols. These materials have the further advantage of low-volatility and when used in plastic masses show a high degree of water resistance and a high degree of flexibility without excessive softness or tackiness. These ether esters have the advantage over simple esters such as lauryl acetate or ethyl laurate, which more closely resemble the paraffin hydrocarbons, in that in general they are better solvents for cellulose derivatives.

The above description and examples are intended to be illustrative only. Any modification of or variation therefrom which conforms to the spirit of the invention is intended to be included within the scope of the claims.

I claim:

1. A composition comprising a cellulose derivative, and as a plasticizer therefor, a carboxylic acid ester of a lauryl ether of a polyhydric alcohol.

2. A composition comprising a cellulose derivative, and as a plasticizer therefor, a monocarboxylic acid ester of a lauryl ether of a polyhydric alcohol.

3. A composition comprising cellulose acetate and lauroxyethyl acetate.

4. A composition comprising cellulose nitrate and lauroxyethyl stearate.

5. A composition comprising a cellulose derivative, and as a plasticizer therefor, a monocarboxylic acid ester of a laurylether of a dihydric alcohol.

6. A composition comprising a cellulose derivative and, as a plasticizer therefor, a carboxylic acid ester of a mixture of long chain alkyl ethers of a polyhydric alcohol, the long chain alkyl radicals of the mixture being substantially identical with those of the alcohols obtainable by the carboxyl reduction of coconut oil.

7. A composition comprising a cellulose derivative and, as a plasticizer therefor, a carboxylic acid ester of a mixture of long chain alkyl ethers of a dihydric alcohol, the long chain alkyl radicals of the mixture being substantially identical with those of the alcohols obtainable by the carboxyl reduction of coconut oil.

8. A composition comprising a cellulose derivative and, as a plasticizer therefor, a carboxylic acid ester of a mixture of long chain alkyl ethers of ethylene glycol, the long chain alkyl radicals of the mixture being substantially identical with those of the alcohols obtainable by the carboxyl reduction of coconut oil.

9. A composition comprising a cellulose derivative and, as a plasticizer therefor, a carboxylic acid ester of a mixture of long chain alkyl ethers of a polyhydric alcohol, the long chain alkyl radicals of the mixture being substantially identical with those of the alcohols obtainable by the carboxyl reduction of a fatty oil.

10. A composition comprising a cellulose derivative and, as a plasticizer therefor, a carboxylic acid ester of a mixture of long chain alkyl ethers of a dihydric alcohol, the long chain alkyl radicals of the mixture being substantially identical with those of the alcohols obtainable by the carboxyl reduction of a fatty oil.

11. A composition comprising a cellulose derivative and, as a plasticizer therefor, a carboxylic acid ester of a mixture of long chain alkyl ethers of ethylene glycol, the long chain alkyl radicals of the mixture being substantially identical with those of the alcohols obtainable by the carboxyl reduction of a fatty oil.

GEORGE DE WITT GRAVES.